(12) United States Patent
Sidelkovskiy et al.

(10) Patent No.: US 12,510,438 B2
(45) Date of Patent: Dec. 30, 2025

(54) METHOD OF INLET DISTORTION PREDICTION AND MONITORING

(71) Applicant: RAYTHEON TECHNOLOGIES CORPORATION, Farmington, CT (US)

(72) Inventors: Dmitriy Sidelkovskiy, Ellington, CT (US); Michael Murphy, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 399 days.

(21) Appl. No.: 18/215,432

(22) Filed: Jun. 28, 2023

(65) Prior Publication Data
US 2025/0003835 A1   Jan. 2, 2025

(51) Int. Cl.
   *G01M 15/14*   (2006.01)
   *F01D 21/00*   (2006.01)
   *G08G 5/52*    (2025.01)
   *G08G 5/55*    (2025.01)

(52) U.S. Cl.
   CPC ......... G01M 15/14 (2013.01); F01D 21/003 (2013.01); G08G 5/52 (2025.01); G08G 5/55 (2025.01); *F05D 2260/81* (2013.01)

(58) Field of Classification Search
   CPC .................................................... G01M 15/14
   See application file for complete search history.

(56) References Cited

U.S. PATENT DOCUMENTS

| 11,448,127 B2* | 9/2022 | Nestico | F02C 7/057 |
| 2009/0092482 A1* | 4/2009 | Winter | F02C 7/047 |
| | | | 415/159 |
| 2020/0070962 A1 | 3/2020 | Sidelkovskiy | |
| 2020/0080477 A1 | 3/2020 | Murphy | |
| 2021/0332764 A1 | 10/2021 | Saripella et al. | |

FOREIGN PATENT DOCUMENTS

| CN | 111079232 | 4/2020 |
| EP | 3447253 | 2/2019 |
| JP | 2018079914 | 5/2018 |
| RU | 2397496 | 8/2010 |

OTHER PUBLICATIONS

European Search Report for European Patent Application No. 24184283.0 dated Jul. 4, 2025.

* cited by examiner

*Primary Examiner* — Eric S. McCall
(74) *Attorney, Agent, or Firm* — Carlson, Gaskey & Olds, P.C.

(57) ABSTRACT

A method for a gas turbine engine includes calculating an inlet airflow distortion value at a reference area within an airflow duct and in front of a fan of the gas turbine engine. The inlet airflow distortion value is indicative of an air pressure of an air vortex at the reference area caused by a set of crosswind conditions. The calculating is based on a ratio between an inlet airflow static air pressure in the reference area and a total ambient air pressure. The inlet airflow distortion value is compared to a threshold corresponding to a permissible amount of inlet airflow distortion at the reference area for the set of crosswind conditions, and, based on the comparison indicating that the inlet airflow distortion exceeds the threshold, an inlet airflow distortion notification is provided. A system for a gas turbine engine and a method for a gas turbine engine are also disclosed.

20 Claims, 8 Drawing Sheets

METHOD OF INLET DISTORTION PREDICTION AND MONITORING

BACKGROUND

This application relates to gas turbine engines, and more particularly to monitoring inlet airflow distortion of gas turbine engines for engine design and engine operability monitoring during engine bench tests, during flight tests, and/or in service.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

An air vortex can arise between a surface (e.g., a ground plane, aircraft fuselage, or aircraft wing) and the engine inlet when the engine is operating on the ground in crosswind conditions. The air vortex may be propagated from the surface into the inlet duct, thereby creating inlet airflow distortion in front of the fan, which increase fan blades structural stress, and can also call engine gas dynamic instability.

It is known to quantity the magnitude of inlet airflow distortion using a distortion index such as IDCmax or DC60, as discussed in Bissinger, N. C., & Breuer, T. (2010). "Basic Principles—Gas Turbine Compatibility—Intake Aerodynamic Aspects." *Encyclopedia of Aerospace Engineering*, Volume 8, Chapter EAE487 and Seddon, J., & Goldsmith, E. L. (1985). "Intake aerodynamics." AIAA education series, New York.

In the prior art, determining the magnitude of inlet airflow distortion required the use of distortion probe rakes arranged circumferentially within a gas turbine engine taking measurements during actual operation of the gas turbine engine.

SUMMARY

A method for a gas turbine engine according to an example embodiment of the present disclosure includes calculating an inlet airflow distortion value at a reference area within an airflow duct of a gas turbine engine and in front of a fan of the gas turbine engine. The inlet airflow distortion value is indicative of an air pressure of an air vortex at the reference area caused by a set of crosswind conditions. The calculating is based on a ratio between an inlet airflow static air pressure in the reference area and a total ambient air pressure. The method also includes comparing the inlet airflow distortion value to a threshold corresponding to a permissible amount of inlet airflow distortion at the reference area for the set of crosswind conditions and, based on the comparison indicating that the inlet airflow distortion exceeds the threshold, providing an inlet airflow distortion notification.

In a further embodiment of the foregoing embodiment, the inlet airflow static air pressure is an average of a plurality of inlet airflow static pressures corresponding to a plurality of rotational speeds of the fan.

In a further embodiment of any of the foregoing embodiments, during a simulated test of the gas turbine engine experiencing the set of crosswind conditions, the inlet airflow static air pressure at the reference area is determined based on an engine performance model.

In a further embodiment of any of the foregoing embodiments, the notification comprises an indication that a design of the fan is rejected.

In a further embodiment of any of the foregoing embodiments, during a bench test or actual runway procedure, the inlet airflow static pressure at the reference area is determined based on measured operational data from the gas turbine engine or its associated powerplant system.

In a further embodiment of any of the foregoing embodiments, the inlet airflow static air pressure is determined during runway operation of an aircraft that includes the gas turbine engine and is experiencing the set of crosswind conditions, and the inlet airflow distortion notification includes a recommendation to a pilot of an aircraft that includes the gas turbine engine to perform a rolling start takeoff.

In a further embodiment of any of the foregoing embodiments, the method includes determining the threshold based on the set of crosswind conditions, a magnitude of airflow to the fan, and a rotational speed of a component of the gas turbine engine.

In a further embodiment of any of the foregoing embodiments, during an actual runway procedure, the threshold is determined further based on a current runway speed of an aircraft that includes the gas turbine engine.

A system for a gas turbine engine according to an example embodiment of the present disclosure includes processing circuitry operatively connected to memory. The processor is configured to calculate an inlet airflow distortion value at a reference area within an airflow duct of a gas turbine engine and in front of a fan of the gas turbine engine. The inlet airflow distortion value is indicative of an air pressure of an air vortex at the reference area caused by a set of crosswind conditions. The calculation is based on a ratio between an inlet airflow static air pressure at the reference area and a total ambient air pressure. The processor is also configured to compare the inlet airflow distortion value to a threshold corresponding to a permissible amount of inlet airflow distortion at the reference area for the set of crosswind conditions and, based on the comparison indicating that the inlet airflow distortion exceeds the threshold, provide an inlet airflow distortion notification.

In a further embodiment of the foregoing embodiments, the inlet airflow static air pressure is an average of a plurality of inlet airflow static pressures corresponding to a plurality of rotational speeds of the fan.

In a further embodiment of any of the foregoing embodiments, the processing circuitry is configured to, during a simulated test of the gas turbine engine experiencing the set of crosswind conditions, determine the inlet airflow static air pressure at the reference area based on an engine performance model.

In a further embodiment of any of the foregoing embodiments, the notification comprises an indication that a design of the fan is rejected.

In a further embodiment of any of the foregoing embodiments, the processing circuitry is configured to, during a bench test or actual runway procedure, determine the inlet airflow static pressure at the reference area based on measured operational data from the gas turbine engine or its associated powerplant system.

In a further embodiment of any of the foregoing embodiments, the inlet airflow static air pressure is determined during runway operation of an aircraft that includes the gas turbine engine and is experiencing the set of crosswind conditions. The inlet airflow distortion notification includes a recommendation to a pilot of an aircraft that includes the gas turbine engine to perform a rolling start takeoff.

In a further embodiment of any of the foregoing embodiments, the processing circuitry is configured to determine the threshold based on the set of crosswind conditions, a magnitude of airflow to the fan, and a rotational speed of a component of the gas turbine engine.

In a further embodiment of any of the foregoing embodiments, the processing circuitry is configured to, during an actual runway procedure, determine the threshold further based on a current runway speed of an aircraft that includes the gas turbine engine.

A method for a gas turbine engine according to an example embodiment of the present disclosure includes calculating an inlet airflow distortion value at a reference area within an airflow duct of a gas turbine engine and in front of a fan of the gas turbine engine. The inlet airflow distortion value is indicative of an air pressure of an air vortex at the reference area caused by a set of crosswind conditions. The calculating is based on a square of a ratio between an inlet airflow static air pressure at the reference area and a total ambient air pressure. The method also includes comparing the inlet airflow distortion value to a threshold corresponding to a permissible amount of inlet airflow distortion at the reference area for the set of crosswind conditions and, based on the comparison indicating that the inlet airflow distortion exceeds the threshold, providing an inlet airflow distortion notification.

In a further embodiment of the foregoing embodiments, the inlet airflow static air pressure is an average of a plurality of inlet airflow static pressures corresponding to a plurality of rotational speeds of the fan.

In a further embodiment of any of the foregoing embodiments, the method also includes determining the threshold based on the set of crosswind conditions, a magnitude of airflow to the fan, and a rotational speed of a component of the gas turbine engine.

In a further embodiment of any of the foregoing embodiments, during an actual runway procedure, the threshold is determined further based on a current runway speed of an aircraft that includes the gas turbine engine.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
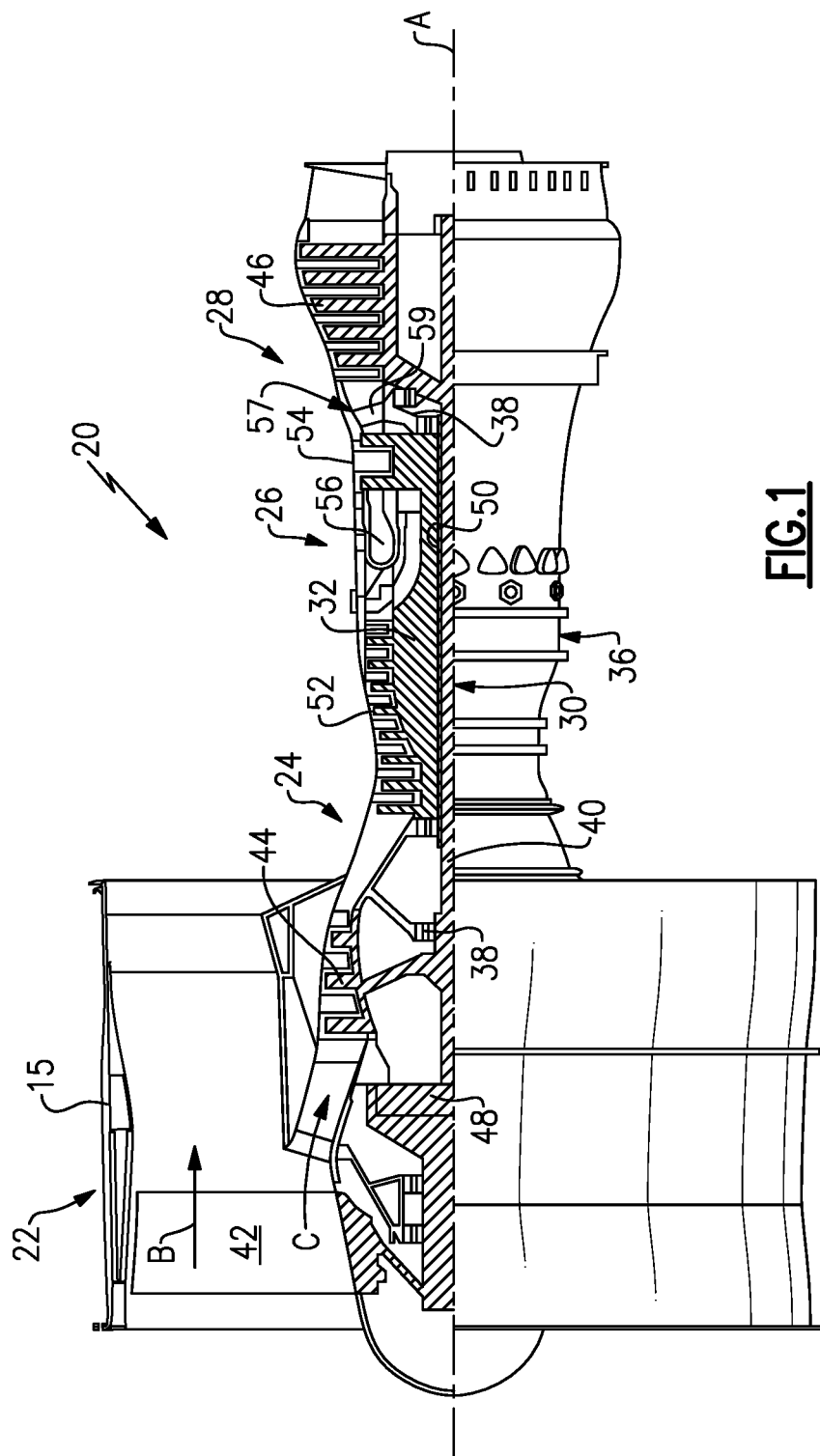
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a fan case 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
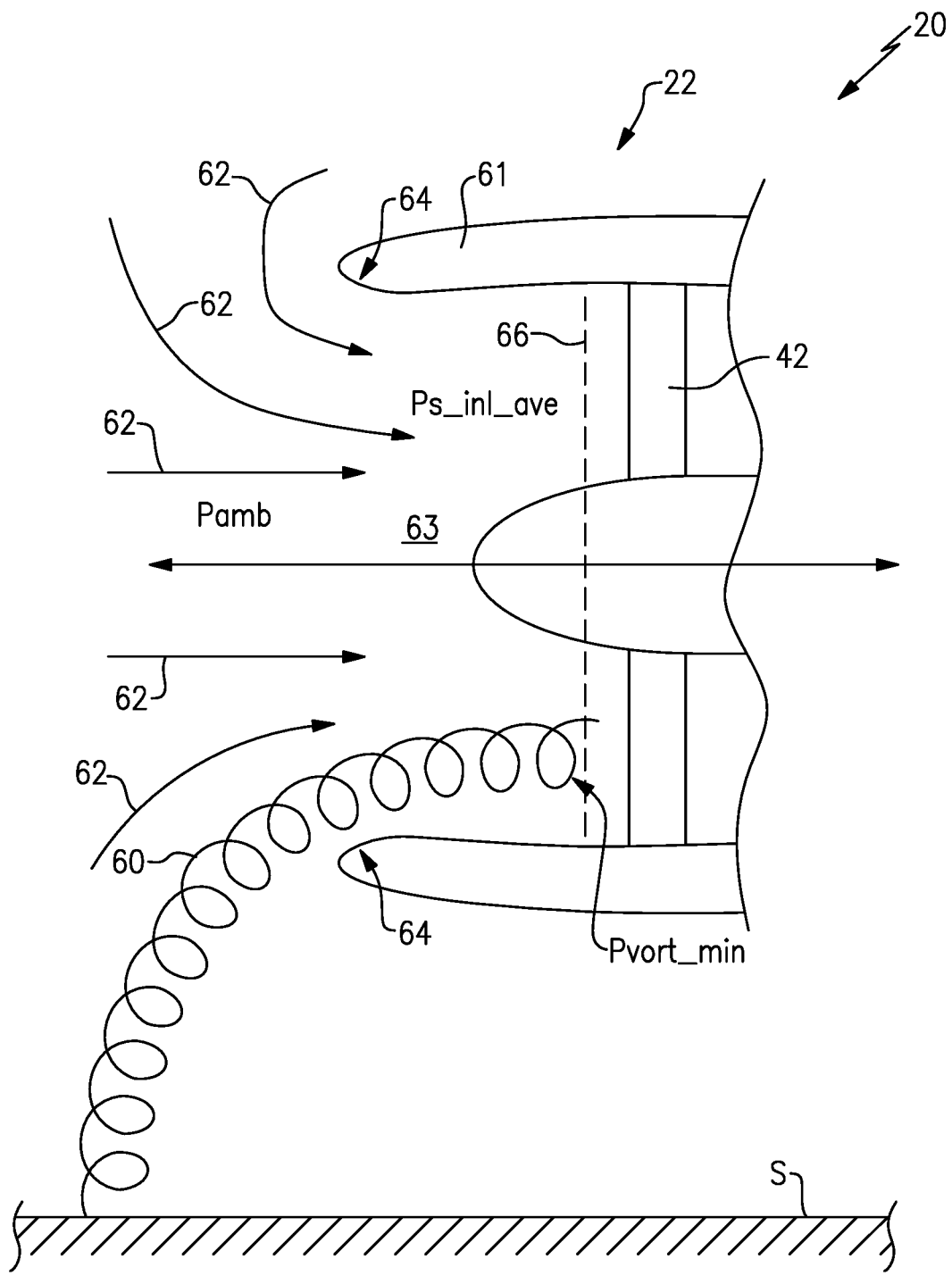
FIG. 2 is a schematic view of an air vortex traveling into the gas turbine engine of FIG. 1.

FIG. 2 is a schematic view of an air vortex 60 that arises between surface S (e.g., the ground, an aircraft fuselage, or aircraft wing) and an inlet of the gas turbine engine. The air vortex 60 is caused by crosswind and travels into the gas turbine engine 20, and is provoked by interference between engine airflow and the surface S. The air vortex 60 travels along with typical inlet airflow streamlines 62 into and within an airflow duct 63, to a reference section 66 in front of the fan 42 of the gas turbine engine 20, and travels towards the fan 42. The airflow duct 63 is at least partially defined by an inlet 61, which attaches to the fan case 15, or may be part of the fan case 15. The inlet 61 includes inlet lips 64 that will be discussed further below. The reference section 66 shown in FIG. 2 is an example, and it is understood that other reference sections in front of the fan 42 and within the inlet 61 could be used. As used herein, "in front of the fan" means fore of the fan 42 (i.e., towards a left side of FIG. 2).

In FIG. 2, Pamb corresponds to a total ambient air pressure, and Ps_inl_ave corresponds to an average (or "mean") static air pressure in the reference section 66 in front of the fan 42 that is averaged for the reference area 66 at each engine rotational speed inlet corrected airflow, accordingly (e.g., in a plane in the reference area that is perpendicular to axis A). The total ambient pressure Pamb is a function of an ambient pressure in front of the fan 42 and air pressure introduced by aircraft speed VCAS (if the aircraft is moving). The mean static air pressure Ps_inl_ave can be defined either by averaging measured data (e.g., obtained, for instance, from static pressure tapes, arranged circumferentially in the airflow duct 63 on a duct outer diameter wall surface at the reference section 66, or can be defined by using predetermined engine performance airflow data in the reference section 66. The Pvort_min is minimum pressure in the vortex 60 at the reference section 66.

Figure 3:
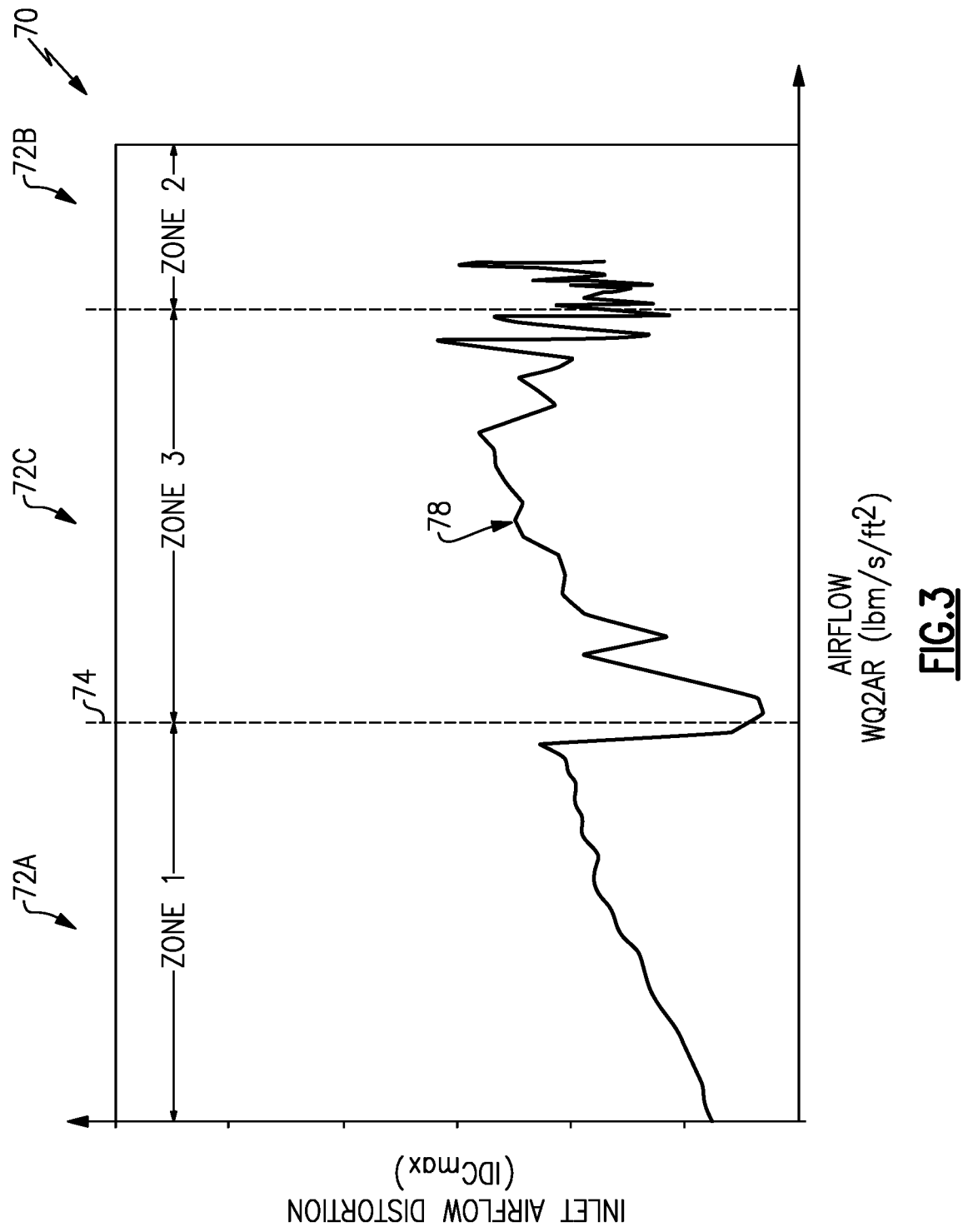
FIG. 3 is a graph that illustrates the effects of an air vortex on inlet airflow distortion.

FIG. 3 is a graph that illustrates the effects of the air vortex 60 on inlet airflow distortion. The y-axis represents inlet airflow distortion according to the IDCmax distortion index discussed above, and the x-axis represents an inlet engine corrected airflow, normalized to the reference section 66 area, that corresponds to an engine power setting (WQ2AR measured in $lbm/s/ft^2$).

There are three distinctive zones on the chart 70, namely Zone 1 (72A), Zone 2 (72B), and Zone 3 (72C). During Zone 1, the gas turbine engine 20 is operating on a low power setting, and there is an initial airflow separation on the inlet 64 lips of the gas turbine engine 20, followed by reattachment at 74 when engine power increases.

The "separation" refers to the capture stream, so there are zones of inlet airflow separation, and the "reattachment" on FIG. 3. The x-axis airflow value at which the reattachment event 74 occurs depends on crosswind speed.

Inlet separation Zone 2 (72B) on the graph 70 occurs during an engine high power setting, where there can again be airflow separation on the inlet lips 64 surface. The engine high power inlet airflow separation is most important for engine operability, and is generally not allowable in service. The inlet lips 64 and inlet 61 are shaped to avoid inlet airflow separation for Zone 2 at the engine high power setting during crosswind conditions.

Zone 3 (72C) is in the range between lower and high engine power inlet airflow separation zones, and commences after airflow reattachment point at 74. During Zone 3, air vortex distortions 78 occur, and are the dominant source of distortion. Although an air vortex 60 can be formed in Zone 1 and the Zone 2, where there is inlet airflow separation, inlet distortion from the air vortex 60 itself is not the dominant source of distortion in Zone 1 or Zone 2.

Traditionally, distortion probe rakes have been necessary to detect air vortex distortions during Zone 3, but the techniques discussed below do not have this requirement. In particular, the techniques discussed herein allow for prediction, designing, and engine validation work stages without requiring distortion probe rake measurements.

Figure 4:
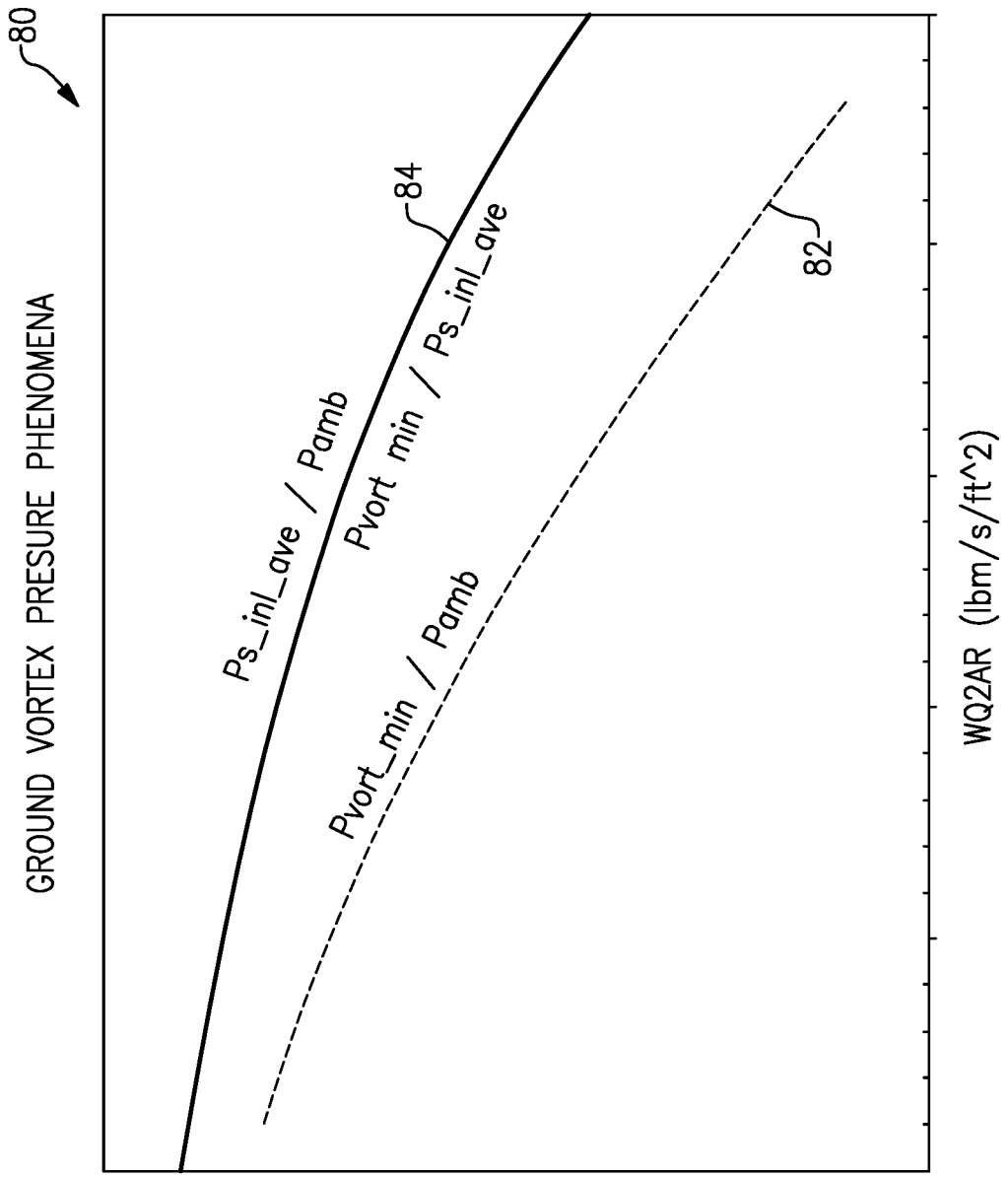
FIG. 4 is graph that illustrates air vortex minimum pressures near the center of an air vortex core, to illustrate found air vortex phenomena.

FIG. 4 is graph that illustrates air vortex minimum pressures near the center of an air vortex core, to illustrate found air vortex phenomena. FIG. 4 contains two lines 82, 84 on the chart, formed by three data sets of measured pressures test points described below, each corresponding to Zone 3 (72C) of FIG. 3 at crosswind speeds of 15-30 knots.

Line 82 interpolates a first data set (Pvort_min/Pamb), which represents pressures measured near the center of the vortex 64 at reference section in front of fan (Pvort_min), and normalized by a total ambient pressure (Pamb).

Line 84 interpolates a second data set and a third data. The second data set (Ps_inl_ave/Pamb) represents an average static pressure in reference section in front of fan (Ps_inl_ave), normalized by total ambient pressure (Pamb).

The third data set (Pvort_min/Ps_inl_ave) represents a ratio of the pressure near center of vortex in reference section (Pvort_min) and an average static pressure in the reference section (Ps_inl_ave). This coincidence represents found air vortex pressure phenomena discussed in equations 1 and 2 below, which summarize a relationship between a minimum air pressure in the air vortex 60 (Pvort_min) and the terms Ps_inl_ave and the Pamb.

$$\frac{Pvort\_min}{Ps\_inl\_ave} = \frac{Ps\_inl\_ave}{Pamb} \qquad \text{equation 1}$$

$$\frac{Pvort\_min}{Pamb} = \left(\frac{Ps\_inl\_ave}{Pamb}\right)^2 \qquad \text{equation 2}$$

In both equations 1 and 2, the term Pamb normalizes Ps_inl_ave. Although a power of 2 is shown in equation 2, it is understood that this is an example, and that another power could be used in the range of 1.98-2.02.

Figure 6:
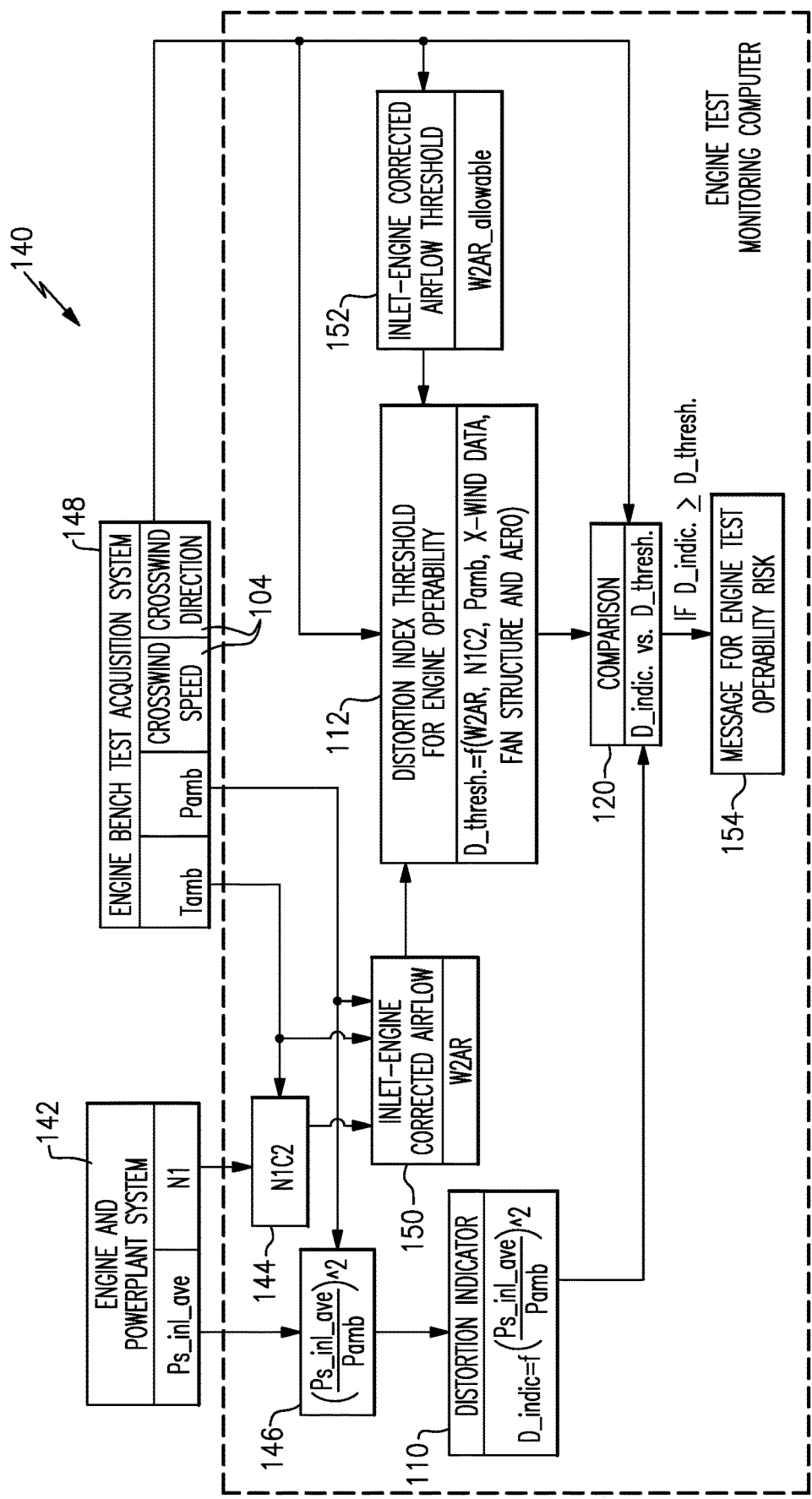
FIG. 6 schematically illustrates a flowchart that describes implementation of the method of FIG. 5 during an engine bench test.
Figure 7:
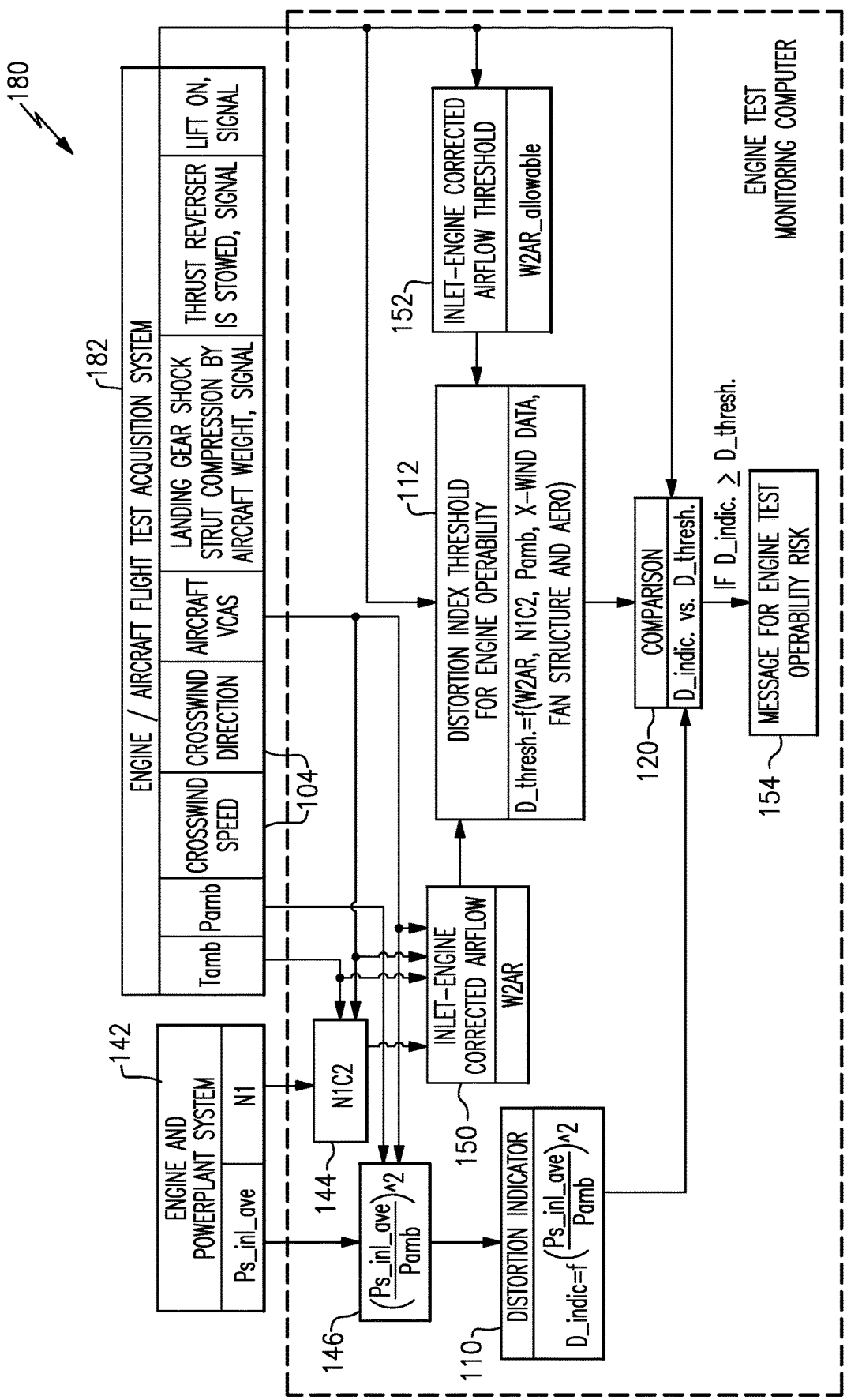
FIG. 7 schematically illustrates a flowchart that describes implementation of the method of FIG. 5 during an aircraft flight test.

The relationships represented in equations 1 and 2 can be applied to create a method of air vortex inlet distortion prediction for engine designing (FIG. 5), as well as for engine operability monitoring during engine bench test (FIG. 6), and flight tests and in service (FIG. 7).

Figure 5:
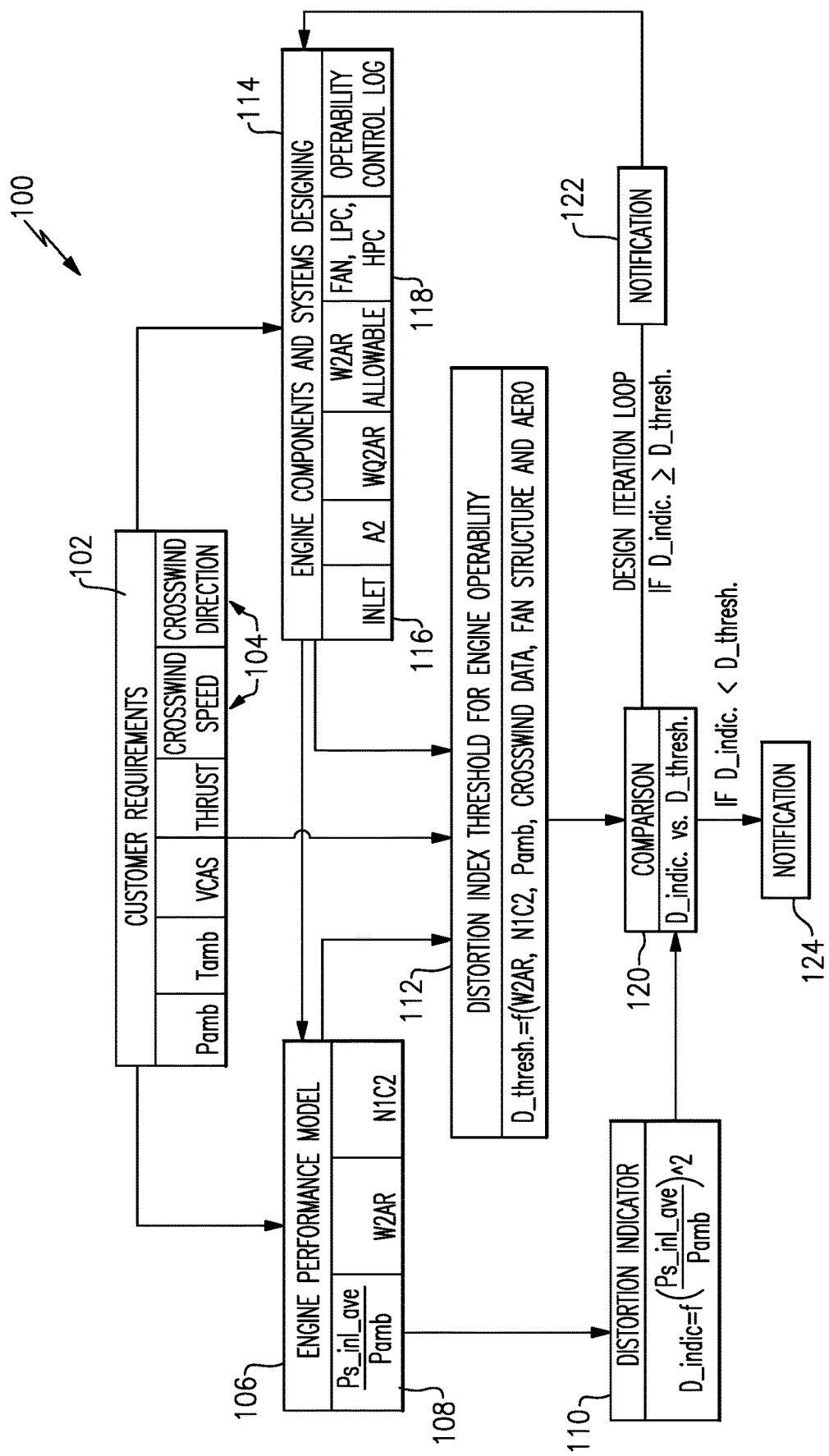
FIG. 5 schematically illustrates a flowchart that demonstrates an air vortex inlet prediction method for engine components during a design iteration loop.

FIG. 5 schematically illustrates a flowchart 100 that demonstrates an air vortex inlet prediction method for engine components during a design iteration loop. Customer requirements 102 are received that describe requirements and required operating conditions of a gas turbine engine 12. The customer requirements include Pamb, an ambient temperature Tamb, an aircraft speed VCAS (e.g., runway speed), thrust requirements, and a set of crosswind conditions 104 that includes a crosswind speed and a crosswind direction relative to the gas turbine engine 20. Aircraft speed VCAS is relevant because increased runway speed can diminish, or if sufficiently high, eliminate the effects of an air vortex.

An engine performance model 106 models the performance of the gas turbine engine 20, and outputs three values: a ratio 108 between Ps_inl_ave and Pamb, W2AR, and N1C2. Ps_inl_ave was introduced above in FIG. 2, and corresponds to an average static air pressure in a reference area 66 of the fan section 22. W2AR corresponds to an airflow in the airflow duct 63 corrected to reference section 66 airflow parameters. N1C2 which corresponds to a rotational speed (N1) of the fan 42 or low pressure compressor 44, corrected to inlet airflow parameters in reference area 66.

A distortion indicator D_indic is determined at 110 as a function of the square of the ratio 108. Thus D_indic is a function of a minimum pressure near a center of the air vortex 60 defined via function of ratio 108. The distortion indicator D_indic was found by the inventors to closely correlate with crosswind inlet model test data as measured by pressure probe rakes, and by comparison of the indicator with distortion, obtained during an engine test, and to provide a suitable alternative to using such rakes.

Referring again to FIG. 5, a threshold D_thresh represents a permissible amount of inlet airflow distortion at the reference area 66 for the set of crosswind conditions 104 (also shown as "crosswind data" in FIG. 5). D_thresh is determined at 112 as a function of W2AR, N1C2, Pamb, the set of cross wind conditions 104, and the structural design and aerodynamic stability of the fan 42, based on a predetermined distortion threshold matrix (e.g., a lookup table). D_thresh is also based on predetermined inlet distortion limits for the fan 42, low pressure compressor 44, and high pressure compressor 52 (as represented by W2AR_allowable below). In one or more embodiments, the distortion threshold value corresponds to an allowable fan structural Goodman value, which does not exceed 100%.

To elaborate, the structure and aerodynamics of the fan 42 are represented by a set of engine components and system design features shown at 114, which includes an inlet configuration 116, a cross section of the reference area 66 in front of fan A2, WQ2AR (discussed above), W2AR_allowable, a design 118 of the fan 42, low pressure compressor 44 and high pressure compressor 52, and an operability control logic that affects one or more control parameters (e.g., RPM, valve position, etc.). W2AR_allowable represents a predetermined engine high power corrected airflow at which the airflow of the airflow duct 63 is separation free. The airflow depends on the inlet configuration 116, N1C2, Pamb, Tamb, VCAS, and the set of crosswind conditions 104. In one example, the regular inlet non-dimensional corrected allowable airflow, normalized to the reference area 66 in front of the fan 42 (WQ2AR), is not higher than 46 lbm/s/ft$^2$.

A comparison 120 is performed between D_indic and D_thresh. Based on the comparison 120 indicating that D_indic exceeds D_thresh, a first type of inlet airflow distortion notification 122 is provided, which may serve as an indication that the gas turbine engine design 114 is rejected. Based on the comparison 120 indicating that D_indic is below D_thresh, a second of inlet airflow distortion notification 124 is provided, which may serve as an indication that the gas turbine engine design 114 is approved.

FIG. 6 schematically illustrates a flowchart 140 that describes implementation of the method of FIG. 5 during an engine bench test. During such a bench test, a crosswind generator may be used to simulate actual crosswind conditions on the ground. In this example, the values Ps_inl_ave and N1 are provided from the gas turbine engine 20 and/or its associated powerplant system 142, instead of being derived from the engine performance model 106.

N1 is corrected to N1C2 at 144, and Ps_inl_ave is utilized to obtain and square the ratio 108 from FIG. 5 at 146 (or use another power in the range 1.98-2.02, as discussed above). The distortion indicator D_indic is obtained at 110 based on the square of the ratio 108.

An engine bench test acquisition system 148 is used to obtain ambient temperature Tamb, ambient pressure Pamb, and the set of crosswind conditions 104. Tamb is used to determine N1C2 at 144, and Pamb is used to determine the square of the ratio 108 at 146. N1C2, Tamb, and Pamb are used to obtain the airflow W2AR in the airflow duct 63 at 150. As in FIG. 5, D_thresh is determined at 112 as a function of W2AR, N1C2, Pamb, the set of cross wind conditions 104, and the structure and aerodynamics of the fan 22.

The inlet-corrected airflow threshold W2AR_allowable (at which the airflow of the airflow duct 63 is separation free) is determined at 152 based on the data from the engine bench test acquisition system 148.

D_indic is compared to D_thresh at 120, and if D_indic exceeds D_thresh, an inlet airflow distortion notification is provided at 154 to indicate an engine test operability risk (e.g., that a design of the fan 42 is rejected). As shown in FIG. 6, an engine test monitoring computer may be used to perform the various steps enclosed within the dotted lines.

FIG. 7 schematically illustrates a flowchart 180 that describes implementation of the method of FIG. 5 during an aircraft flight test. The flowchart 180 is similar to the flowchart 140 with a handful of differences, most notably that the speed VCAS is obtained from an engine/aircraft flight test acquisition system 182, and is used to determine N1C2 at 144 and to determine the square of the ratio 108 at 146. Here, the set of crosswind conditions 104 are obtained from one or more sensors. VCAS is zero during a bench test, so it was not used in the flowchart 140 of FIG. 6. Another difference from the flowchart 140 is that the flowchart 180 uses additional system inputs, identified with reference numeral 182, as compared to the inputs to the flowchart 140.

In one example, the notification 154 in the flowchart 180 includes a recommendation to a pilot to perform a rolling start, to mitigate the effects of an air vortex on the fan 42 and gas turbine engine 20.

In one example, the notification 154 is only provided if the following conditions are also true:

W2AR<W2AR_allowable,

VCAS<VCAS_rolling_start (a rolling start runway speed that is at least 35 knots), The landing gear strut compression signal is ON (indicating that an aircraft that includes the gas turbine engine 20 is on the ground) (see 182 in FIG. 7), a Lift ON signal is ON (see 182 in FIG. 7), which is indicative of a flight condition (e.g., take-off or landing), and a thrust reverser stowed signal is ON (see 182 in FIG. 7).

Figure 8:
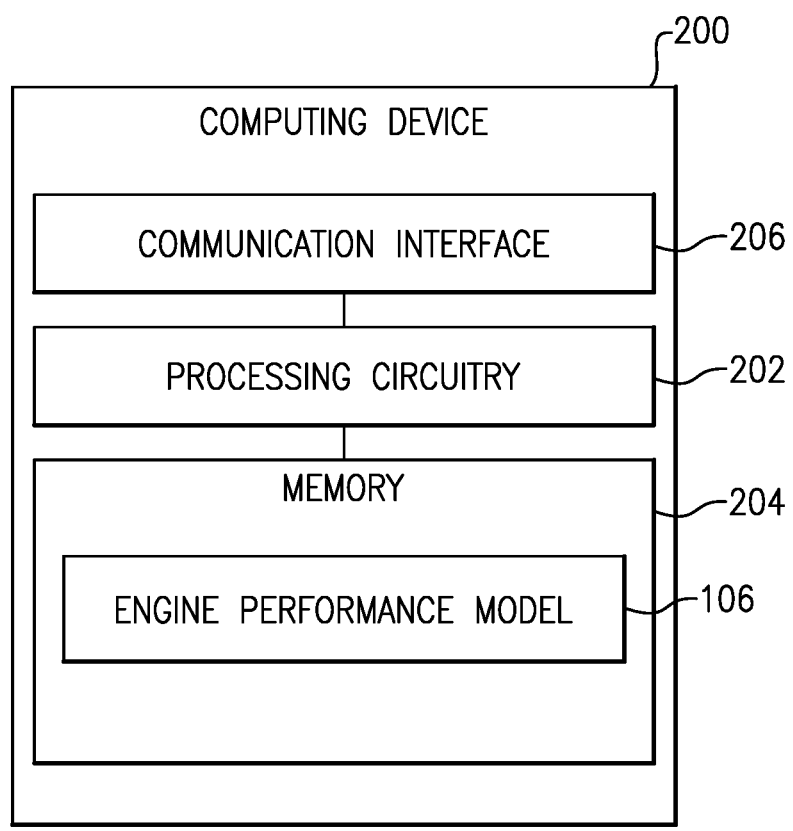
FIG. 8 schematically illustrates an example computing device that may be used to perform steps of the flowcharts of FIGS. 5-7.

FIG. 8 schematically illustrates an example computing device 200 that may be used to perform steps of the flowcharts of FIGS. 5-7. The computing device 200 includes processing circuitry 202 operatively connected to memory 204 and a communication interface 206. The processing circuitry 202 may include one or more microprocessors, microcontrollers, application specific integrated circuits (ASICs), or the like, for example.

The memory 204 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media. The memory 204 can also have a distributed architecture, where various components are situated remotely from one another, but can be accessed by the processing circuitry 202. The memory 204 may be used to store the engine performance model 106 of FIG. 5, for example.

The communication interface 206 is configured to facilitate communication between the computing device 200 and other devices (e.g., sensors associated with the gas turbine engine, to receive measurements such as Pamb, Tamb, etc.). The computing device 200 may be configured to perform some or all of any of the steps of the flowcharts 100, 140, 180.

The techniques discussed herein for assessing inlet airflow distortion offer improvements over the prior art, as detailed inlet duct flow field pressure measurements are not required. As a result, gas turbine engine 20 design validation can be performed more efficiently, saving time and reducing cost.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for a gas turbine engine, comprising:

calculating an inlet airflow distortion value at a reference area within an airflow duct of a gas turbine engine and in front of a fan of the gas turbine engine, the inlet airflow distortion value indicative of an air pressure of an air vortex at the reference area caused by a set of crosswind conditions, said calculating based on a ratio between an inlet airflow static air pressure in the reference area and a total ambient air pressure;

comparing the inlet airflow distortion value to a threshold corresponding to a permissible amount of inlet airflow distortion at the reference area for the set of crosswind conditions; and based on the comparison indicating that the inlet airflow distortion exceeds the threshold, providing an inlet airflow distortion notification.

2. The method of claim 1, wherein the inlet airflow static air pressure is an average of a plurality of inlet airflow static pressures corresponding to a plurality of rotational speeds of the fan.

3. The method of claim 1, during a simulated test of the gas turbine engine experiencing the set of crosswind conditions, the inlet airflow static air pressure at the reference area is determined based on an engine performance model.

4. The method of claim 1, wherein the notification comprises an indication that a design of the fan is rejected.

5. The method of claim 1, wherein during a bench test or actual runway procedure, the inlet airflow static pressure at the reference area is determined based on measured operational data from the gas turbine engine or its associated powerplant system.

6. The method of claim 1, wherein:

the inlet airflow static air pressure is determined during runway operation of an aircraft that includes the gas turbine engine and is experiencing the set of crosswind conditions; and the inlet airflow distortion notification includes a recommendation to a pilot of an aircraft that includes the gas turbine engine to perform a rolling start takeoff.

7. The method of claim 1, comprising:

determining the threshold based on the set of crosswind conditions, a magnitude of airflow to the fan, and a rotational speed of a component of the gas turbine engine.

8. The method of claim 7, wherein during an actual runway procedure, the threshold is determined further based on a current runway speed of an aircraft that includes the gas turbine engine.

9. A system for a gas turbine engine, comprising:

processing circuitry operatively connected to memory, the processor configured to:

calculate an inlet airflow distortion value at a reference area within an airflow duct of a gas turbine engine and in front of a fan of the gas turbine engine, the inlet airflow distortion value indicative of an air pressure of an air vortex at the reference area caused by a set of crosswind conditions, the calculation based on a ratio between an inlet airflow static air pressure at the reference area and a total ambient air pressure;

compare the inlet airflow distortion value to a threshold corresponding to a permissible amount of inlet airflow distortion at the reference area for the set of crosswind conditions; and based on the comparison indicating that the inlet airflow distortion exceeds the threshold, provide an inlet airflow distortion notification.

10. The system of claim 9, wherein the inlet airflow static air pressure is an average of a plurality of inlet airflow static pressures corresponding to a plurality of rotational speeds of the fan.

11. The system of claim 9, the processing circuitry is configured to, during a simulated test of the gas turbine engine experiencing the set of crosswind conditions, determine the inlet airflow static air pressure at the reference area based on an engine performance model.

12. The system of claim 9, wherein the notification comprises an indication that a design of the fan is rejected.

13. The system of claim 9, wherein the processing circuitry is configured to, during a bench test or actual runway procedure, determine the inlet airflow static pressure at the reference area based on measured operational data from the gas turbine engine or its associated powerplant system.

14. The system of claim 9, wherein:
the inlet airflow static air pressure is determined during runway operation of an aircraft that includes the gas turbine engine and is experiencing the set of crosswind conditions; and
the inlet airflow distortion notification includes a recommendation to a pilot of an aircraft that includes the gas turbine engine to perform a rolling start takeoff.

15. The system of claim 9, wherein the processing circuitry is configured to:
determine the threshold based on the set of crosswind conditions, a magnitude of airflow to the fan, and a rotational speed of a component of the gas turbine engine.

16. The system of claim 15, wherein the processing circuitry is configured to, during an actual runway procedure, determine the threshold further based on a current runway speed of an aircraft that includes the gas turbine engine.

17. A method for a gas turbine engine, comprising:
calculating an inlet airflow distortion value at a reference area within an airflow duct of a gas turbine engine and in front of a fan of the gas turbine engine, the inlet airflow distortion value indicative of an air pressure of an air vortex at the reference area caused by a set of crosswind conditions, said calculating based on a square of a ratio between an inlet airflow static air pressure at the reference area and a total ambient air pressure;
comparing the inlet airflow distortion value to a threshold corresponding to a permissible amount of inlet airflow distortion at the reference area for the set of crosswind conditions; and
based on the comparison indicating that the inlet airflow distortion exceeds the threshold, providing an inlet airflow distortion notification.

18. The method of claim 17, wherein the inlet airflow static air pressure is an average of a plurality of inlet airflow static pressures corresponding to a plurality of rotational speeds of the fan.

19. The method of claim 17, comprising:
determining the threshold based on the set of crosswind conditions, a magnitude of airflow to the fan, and a rotational speed of a component of the gas turbine engine.

20. The method of claim 17, wherein during an actual runway procedure, the threshold is determined further based on a current runway speed of an aircraft that includes the gas turbine engine.

* * * * *